United States Patent [19]

Hertell

[11] Patent Number: 4,459,091
[45] Date of Patent: Jul. 10, 1984

[54] ROTARY VANE PUMP

[75] Inventor: Siegfried Hertell, Remscheid, Fed. Rep. of Germany

[73] Assignee: Barmag Barmer Maschinenfabrik AK, Remscheid, Fed. Rep. of Germany

[21] Appl. No.: 391,829

[22] Filed: Jun. 24, 1982

[30] Foreign Application Priority Data

Jun. 25, 1981 [DE] Fed. Rep. of Germany ....... 3124895
Aug. 13, 1981 [DE] Fed. Rep. of Germany ....... 3132053

[51] Int. Cl.$^3$ .............................................. F01C 1/00
[52] U.S. Cl. .................................................. 418/259
[58] Field of Search ............... 418/259, 266, 267, 268, 418/269, 82

[56] References Cited

U.S. PATENT DOCUMENTS

| 771,593 | 10/1904 | Welsh ................................... 418/259 |
| 2,070,662 | 2/1937 | Johnson ................................. 418/91 |
| 3,088,660 | 5/1963 | Voggenthaler ........................ 418/91 |
| 4,231,728 | 11/1980 | Hertell .................................. 418/79 |
| 4,354,809 | 10/1982 | Sundberg ............................ 418/268 |
| 4,374,632 | 2/1983 | Wilcox ................................... 418/82 |

FOREIGN PATENT DOCUMENTS 2617514 11/1977 Fed. Rep. of Germany.
2804957 8/1979 Fed. Rep. of Germany.
629501 11/1927 France ............................... 418/259

Primary Examiner—Leonard E. Smith
Assistant Examiner—Jane E. Obee
Attorney, Agent, or Firm—Bell, Seltzer, Park & Gibson

[57] ABSTRACT

A rotary vane pump is provided which comprises a cylindrical housing, and a cylindrical rotor mounted within the housing. The rotor includes a number of radial guide slots extending axially along the length of the rotor, with each slot having a depth along at least a portion of its axial length which extends to the axis of the rotor. A blade is slideably disposed in each slot, and has a height which generally corresponds to the depth of the slot. This arrangement permits the rotor to be compact in size, and yet able to provide an adequate area of contact between the blades and rotor slots in the extended position of the blades.

17 Claims, 7 Drawing Figures

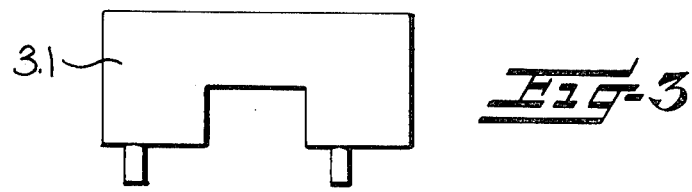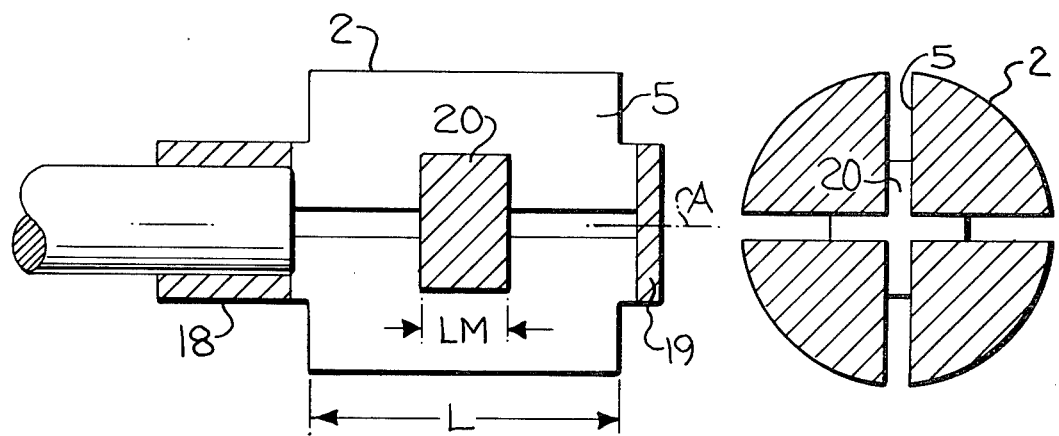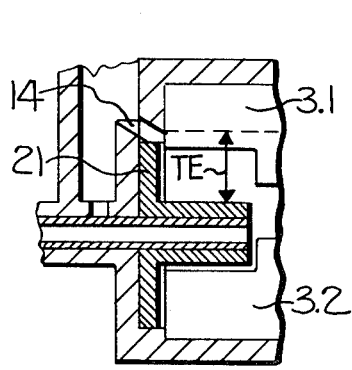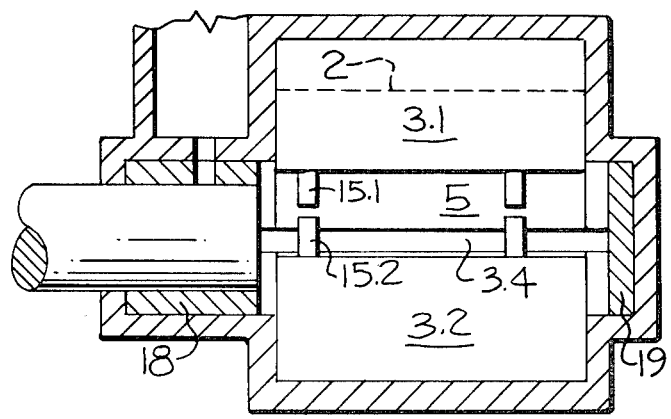

ROTARY VANE PUMP

The present invention relates to a rotary vane pump of the type presently utilized, for example, in motor vehicles to produce a partial vacuum for use in the power brake system. Pumps of this general type are disclosed in German Offenlegungsschrift No. 26 17 514, German Gebrauchsmuster Gm No. 77 08 908, and German Offenlegungsschrift No. 28 04 957.

In order to minimize cost and power consumption in rotary vane pumps having small dimensions, it is necessary to construct a pump having a compact configuration and which also is able to provide a high delivery volume. In addition, reliability under extreme operating conditions, such as cold, sticking blades, etc., should be insured with a simple construction.

It is recognized that the delivery volume of a pump of the described type is dependent on the axial length of the pump. In addition, the delivery volume is dependent on the difference RG - RR, RG being the radius of the housing and RR being the radius of the rotor. The greater this difference, the higher the delivery volume. However, this difference may not be of any selected amount, since the blades reciprocate in the guide slots between an extended and a retracted position, and when the blades are in their extended position they must have adequate surface contact with the guide slots to insure that the blades can withstand the forces and relative speeds acting thereon, without being damaged or suffering undue wear.

In accordance with the present invention, these objectives are achieved by the provision of a rotary vane pump which is of compact configuration and size, which is able to operate at high speed, and which is capable of withstanding the operating forces and material stresses which develop under its operating pressures. Also, the pump of the present invention permits the difference between the housing radius and rotor radius to be its maximum possible value.

More particularly, the rotary vane pump of the present invention comprises a cylindrical housing having a fluid inlet and a fluid outlet, a rotor eccentrically mounted for rotation within the housing and including a plurality of radial guide slots extending along the axial direction of the rotor, and a vane slideably disposed within each of the guide slots for movement in the radial direction. The guide slot depth and blade height are correspondingly stepped along the axial length of the rotor, and so that the slot depth and blade height are greater along at least one portion of the axial length of the rotor than along at least one other portion of the axial length of the rotor.

The present invention is further characterized in that the rotor bearing does not limit the depth of the guide slots or the height of the blades, and that a broad area of support and guidance of the blades in the slots is possible despite a minimal rotor radius. According to the invention, it is possible to construct the blades in such a manner that their height essentially corresponds with the rotor radius, even when the blades are radially arranged, and without thereby weakening the bearing of the rotor or of the blades.

Some of the objects and advantages having been stated, other objects and advantages of the present invention will appear as the description proceeds, when taken in connection with the accompaning drawings in which:

FIG. 3 is an elevation view of a blade adapted for use in a different embodiment of the invention;

FIG. 4 is a sectional elevation view of a rotor adapted for use with the blade of FIG. 3;

FIG. 5 is a sectional end view of the rotor shown in FIG. 4;

FIG. 6 is a fragmentary sectional view illustrating one end of a rotor and the adjacent portion of the housing of another embodiment of the invention; and FIG. 7 is a sectional elevation view of still another embodiment of the present invention.

Figure 1:
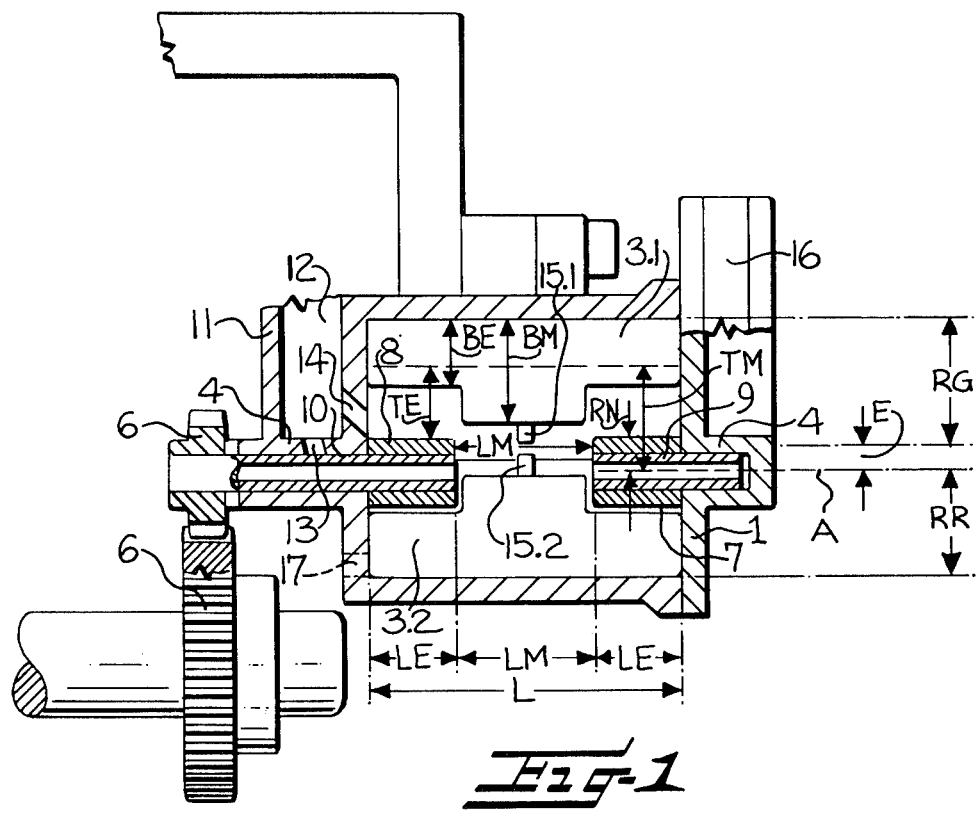
FIG. 1 is a sectional elevation view of a rotary vane pump emboding the features of the present invention.
Figure 2:
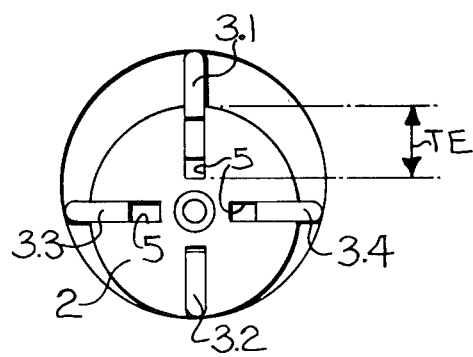
FIG. 2 is a sectional end view of the pump shown in FIG. 1.

Referring more particularly to the drawings, FIG. 1 and 2 illustrate one embodiment of a rotary vane pump in accordance with the present invention. The pump includes a cylindrical housing 1 having a fluid inlet 16 and a fluid outlet 17. A cylindrical rotor 2 is eccentrically mounted for rotation within the housing for rotation about the axis A, and it includes four radial guide slots 5 extending along the axial direction of the rotor. A total of four blades 3.1, 3.2, 3.3 and 3.4 are slideably disposed within respective ones of the guide slots for movement in the radial direction between an extended position (note blade 3.1) and a retracted position (note blade 3.2). The pump has an even number of guide slots and associated blades, and the slots and blades are aligned in coplanar pairs. Thus the blades 3.1 and 3.2 are supported in one axial plane, and the blades 3.3 and 3.4 are supported in a perpendicular axial plane, note FIG. 2. The rotor is supported for rotation in the two aligned bearing supports 4 of the housing. In addition, the rotor has hubs 7 and 8, as well as shaft segments 9 and 10 which extend between the hubs 7, 8, and supports 4. The rotor is driven by the gears 6 which are connected to a suitable power source, not shown.

Each aligned pair of guide slots 5 extends completely through the rotor in the medial area LM of the cylindrical rotor, whereas in the area LE adjacent each end of the rotor, the guide slots extend only to the circumference of the hubs 7 and 8. This means that, at the end portions of the rotor, the depth TE of each guide slot equals RR minus RN (TE=RR−RN), with RR being the rotor radius and RN being the radius of the hubs 7 and 8.

Similarly, the height of the blades 3.1 through 3.4 is stepped in accordance with the depth of the associated guide slots. Thus in the end areas LE of the blade axial length L, the height BE is greater than twice the eccentricity E, but smaller than or approximately the same as the slot depth TE in the end areas, which equals the difference between the rotor radius and hub radius. Thus, TE=RR−RN≧BE>2E.

In the medial area LM, the blade height BM is greater than BE, but smaller than the housing radius RG. In the illustrated embodiment, the slot depth TM and blade height BM in the medial area LM are each substantially the same as the rotor radius RR. Spacer pins 15.1 and 15.2 are provided along the inner edge of the blades, which serve to prevent the blades from sticking in their fully retracted position. Thus, RG>BM>BE.

Means are provided for lubricating the blades, which comprises a lubrication passageway 14 in the housing 1, and which communicates with the area adjacent one end of the rotor which encompasses the slots. Also, a passageway 13 is provided on the support 4 to lubricate the shaft 10. Oil is supplied to the lubrication passageways 14 and 13 through a duct 12, which is formed by a wall 11 on the outside of the pump housing, and which has an upwardly extending opening for receiving oil in a manner not shown.

The pump of the present invention does not require any pressurized oil to move the blades out to their extended position in the event they should stick. Rather, the spacer pins 15.1 and 15.2 serve this purpose. The pin length of the blades may be reduced to a minimum so as to avoid unacceptably high values of oil through flow, and without reducing the sealing effect of the blades toward the low pressure chamber. The blades are prevented from canting in their rotor slot by reason of the fact that they are of substantial height in their intermediate area.

From the above disclosure, it will be seen that in accordance with the present invention, the radius RN of the hub is limited, so as to insure that the blades have sufficient sealing height in their slots. A sufficient guide length and contact surface for the blades is insured in the intermediate or medial area LM of the slots.

In another embodiment, the rotor may be provided with a cylindrical mounting hub coaxially positioned at each axial end of the rotor for the purpose of providing additional coherence for the rotor segments, and to facilitate the transmission of torque. Such an embodiment of a rotor is shown in partial sectional view in FIG. 6 at 21. As shown, the hub 21 is placed or molded on the end of the rotor of the type shown in FIG. 1, with the outer diameter of the hub being sufficient to extend radially beyond the innermost edges of the adjacent portions of the guide slots.

In the embodiment of FIGS. 3-5 and 7, an adequate depth of the slots 5 is achieved by placing hubs 18 and 19 on the ends of the rotor, and which serve to rotatably mount the ends of the rotor in the housing. This arrangement permits the blades to extend completely to the rotor axis when in their fully retracted position. This makes it possible to construct the blades of a height corresponding to the radial dimension of the rotor, and so that there is an adequate guide and contact surface to take up the contact pressures and sealing effect in the extended position. As illustrated in FIG. 7, the guide slots 5 may extend to the rotor axis over the entire rotor axial length, and such that the guide slot depth and blade height each substantially correspond to the radius of the rotor along the full axial length of the rotor. With an even number of slots and blades, and with the slots and blades being paired in common axial planes, each pair of the slots may extend completely through the rotor from one circumferential area on one side of the rotor to the corresponding circumferential area displaced by 180 degrees.

In the embodiment shown in FIG. 4, a central hub 20 is provided in the rotor for stabilizing purposes. The central hub 20 thus results in the slot depth being stepped so as to be greater along each end portion of the axial length of the rotor as compared to the slot depth along the medial portion LM of the axial length of the rotor. The blades are correspondingly stepped, note FIG. 3, and include an intermediate area having a width such that the blade may extend to the circumference of the hub 20 along the medial portion, and to the axis of the rotor along each end portion thereof.

In the drawings and specification, there has been set forth a preferred embodiment of the invention, and although specific terms are employed, they are used in a generic and descriptive sense only and not for purposes of limitation.

That which is claimed is:

1. A rotary vane pump adapted for use as a vacuum pump in an automobile or the like, and which comprises a cylindrical housing having a fluid inlet and a fluid outlet, a cylindrical rotor eccentrically mounted for rotation within said housing and including a plurality of radial guide slots extending along the axial direction of said rotor, and a blade slideably disposed within each of said slots for movement in the radial direction, the improvement wherein each of the slots defines opposite side walls which extend to a depth which substantially corresponds to the radius of the rotor along at least a substantial portion of its axial length, and the height of each blade also substantially corresponds to the radius of the rotor along said at least a substantial portion of its axial length, to thereby provide a broad area of support for the blades in the slots.

2. The rotary vane pump as defined in claim 1, wherein said rotor includes a mounting hub coaxially positioned at each axial end thereof for facilitating the mounting thereof in said housing.

3. The rotary vane pump as defined in claim 1 or 2, wherein the guide slot depth and blade height each substantially correspond to the radius of the rotor along substantially the full axial length of said rotor.

4. A rotary vane pump adapted for use as a vacuum pump in an automobile or the like, and which comprises a cylindrical housing having a fluid inlet and a fluid outlet, a rotor eccentrically mounted for rotation within said housing and including a plurality of radial guide slots extending along the axial direction of said rotor, and a blade slideably disposed within each of said slots for movement in the radial direction, the improvement wherein the guide slot depth and blade height are correspondingly stepped along their axial length, and so that the slot depth and blade height are greater along at least one portion of the axial length of the rotor than along at least one other portion of the axial length of the rotor, and wherein each of the slots defines opposite side walls which extend to a depth which substantially corresponds to the radius of the rotor along said one portion of the axial length of the rotor, and the height of each blade also substantially corresponds to the radius of the rotor along said one portion of the axial length of the rotor, to thereby provide a broad area of support for the blades in the slots.

5. The rotary vane pump as defined in either claim 4 or 1 wherein each of said blades includes spacer pin means extending radially inwardly from the inner edge thereof for engaging and outwardly moving the opposed blade in the event the opposed blade should stick in its fully retracted position in said rotor.

6. The rotary vane pump as defined in either claim 4 or 1 further comprising means rotatably mounting said rotor in said housing which includes a cylindrical hub positioned coaxially on each axial end of said rotor, with each hub having a diameter which extends radially beyond the innermost edges of the adjacent portions of said slots, and a socket formed in said housing adjacent each end of said rotor and rotatably receiving the outer periphery of respective ones of said hubs therein.

7. The rotary vane pump as defined in claim 4 wherein the slot depth and blade height are stepped so as to be greater along the medial portion of the axial length of said rotor as compared to the slot depth and blade width along at least one end portion of the axial length of the rotor.

8. The rotary vane pump as defined in claim 7 wherein the slots each extend to the axis of said rotor along the medial portion of the axial length of said rotor and communicate with each other, and wherein the height of each blade is essentially the same as the radius of said rotor along such medial portion.

9. The rotary vane pump as defined in claim 8 wherein the slot depth is less than the radius of the rotor adjacent each axial end thereof, and wherein the height of each blade adjacent each of its ends is essentially the same as the depth of the slot adjacent the axial ends of the rotor.

10. The rotary vane pump as defined in claim 9 wherein the pump has an even number of guide slots and associated blades, and wherein the slots and blades are aligned in coplanar pairs.

11. The rotary vane pump as defined in any one of claims 4 or 7-10 wherein said rotor includes a cylindrical mounting hub coaxially positioned at each axial end of said rotor, with each hub having a diameter sufficient to extend radially beyond the intermost edges of the adjacent portions of the slots.

12. The rotary vane pump as defined in claim 4 wherein the slot depth and blade height are stepped so as to be greater along each end portion of the axial length of the rotor as compared to the slot depth and blade height along the medial portion of the axial length of the rotor.

13. The rotary vane pump as defined in claim 12 wherein the slots each extend to the axis of said rotor along each of the end portions of the axial length of said rotor and communicate with each other, and wherein the height of each blade is essentially the same as the radius of said rotor along such end portions.

14. The rotary vane pump as defined in claim 13 wherein the slot depth is less than the radius of the rotor adjacent the medial portion of the axial length of said rotor, and wherein the height of each blade adjacent such medial portion is essentially the same as the depth of the slot adjacent such medial portion.

15. The rotary vane pump as defined in claim 14 wherein the medial portion of said slots is defined by a central hub, and wherein each of the blades has a height along its medial portion which is essentially the same as the difference between the radius of said rotor and the radius of said central hub, and a height adjacent each end portion which is essentially the same as the radius of said rotor.

16. The rotary vane pump as defined in claim 15 wherein said rotor includes a mounting hub coaxially positioned at each axial end thereof for facilitating the mounting thereof in said housing.

17. The rotary vane pump as defined in either claim 7 or 12 wherein said housing includes a duct having an upwardly extending opening adapted to receive a lubricant, and a passageway communicating between said duct and the area adjacent one end of the rotor which encompasses said slots.

* * * * *